(12) United States Patent
Ketels et al.

(10) Patent No.: US 9,233,633 B2
(45) Date of Patent: Jan. 12, 2016

(54) VEHICLE WITH COMBINATION BODY, TAILGATE, AND CONVEYOR ASSEMBLY

(75) Inventors: Timothy J. Ketels, Dyersville, IA (US);
Mark S. Hollinrake, Marion, IA (US);
Daniel J. Banyas, Masonville, IA (US);
Glenn L. Ungerer, Swisher, IA (US);
Mart E. Ward, Manchester, IA (US)

(73) Assignee: HENDERSON PRODUCTS, INC., Manchester, IA (US)

( * ) Notice: Subject to any disclaimer, the term of this patent is extended or adjusted under 35 U.S.C. 154(b) by 0 days.

(21) Appl. No.: 13/018,250

(22) Filed: Jan. 31, 2011

(65) Prior Publication Data
US 2011/0188979 A1 Aug. 4, 2011

Related U.S. Application Data

(60) Provisional application No. 61/299,623, filed on Jan. 29, 2010.

(51) Int. Cl.
| | |
|---|---|
| *B60P 1/38* | (2006.01) |
| *B60P 1/00* | (2006.01) |
| *B60P 1/04* | (2006.01) |
| *B62D 33/02* | (2006.01) |
| *B62D 33/03* | (2006.01) |

(52) U.S. Cl.
CPC ... *B60P 1/00* (2013.01); *B60P 1/04* (2013.01); *B60P 1/38* (2013.01); *B62D 33/02* (2013.01); *B62D 33/03* (2013.01)

(58) Field of Classification Search
CPC .................................... B60P 1/36; B60P 1/38
USPC ............... 414/518–520, 528; 296/61, 193.08, 296/203.04; 198/816
See application file for complete search history.

(56) References Cited

U.S. PATENT DOCUMENTS

| | | | | | |
|---|---|---|---|---|---|
| 1,928,859 | A | * | 10/1933 | Kutscha | 414/518 |
| 2,808,924 | A | * | 10/1957 | Wood | 198/816 |
| 3,361,476 | A | * | 1/1968 | Smock | 298/7 |
| 5,400,974 | A | * | 3/1995 | Musso, Jr. et al. | 239/672 |
| 5,653,567 | A | * | 8/1997 | Taylor | 414/519 |
| 5,772,389 | A | | 6/1998 | Feller | |
| 5,890,867 | A | * | 4/1999 | Hagemeyer | 414/519 |
| 6,394,735 | B2 | | 5/2002 | Hollinrake et al. | |
| 6,585,472 | B2 | | 7/2003 | Hollinrake et al. | |
| 6,945,482 | B2 | | 9/2005 | Hollinrake et al. | |
| 7,913,931 | B2 | | 3/2011 | Hollinrake et al. | |
| 7,934,594 | B2 | | 5/2011 | Richardson et al. | |
| 2003/0161709 | A1 | * | 8/2003 | Musso et al. | 414/528 |
| 2005/0111946 | A1 | | 5/2005 | Hintzsche et al. | |
| 2005/0230507 | A1 | | 10/2005 | Hollinrake et al. | |
| 2005/0231021 | A1 | | 10/2005 | Hollinrake et al. | |
| 2008/0203187 | A1 | | 8/2008 | Ward et al. | |
| 2010/0096469 | A1 | | 4/2010 | Holverson et al. | |
| 2011/0186649 | A1 | | 8/2011 | Richardson et al. | |

* cited by examiner

*Primary Examiner* — Jonathan Snelting
(74) *Attorney, Agent, or Firm* — Leydig, Voit & Mayer, Ltd.

(57) ABSTRACT

A vehicle can include a chassis, a combination body pivotally secured to the chassis, a conveyor assembly disposed within the body and adapted to convey materials stored within the body out therefrom, and a tailgate attached to the body. The body includes a front end, an open rear end, and first and second side walls extending therebetween. A rear body superstructure extends around the rear end of the body to reinforce and strengthen the rear end of the body. The conveyor assembly includes a conveyor shaft assembly that allows for easy removal and installation of conveyor shafts and accompanying parts. A tailgate chute is removably mounted to the tailgate via a pair of mounting hooks and a mounting bar extending across an opening of the tailgate.

19 Claims, 10 Drawing Sheets

VEHICLE WITH COMBINATION BODY, TAILGATE, AND CONVEYOR ASSEMBLY

CROSS-REFERENCE TO RELATED APPLICATIONS

This patent application claims the benefit of priority to U.S. Provisional Patent Application No. 61/299,623, filed on Jan. 29, 2010, and entitled "Vehicle With Combination Body, Tailgate, And Conveyor Assembly," which is incorporated in its entirety herein by this reference.

BACKGROUND OF THE INVENTION

One type of apparatus which provides for both the dumping and spreading of material, such as sand, salt, gravel, asphalt and the like, onto a surface is commonly referred to as a combination body. Combination bodies are so named because they provide, in combination, both dumping and spreading functions. Examples of combination bodies are shown and described in U.S. Pat. Nos. 5,400,974; 5,772,389; and 6,394,735.

In general, combination bodies are pivotally mounted to the chassis of a vehicle, typically a truck chassis. Although the bodies can be mounted so as to pivot in one or more directions, the most common mounting arrangement provides a hinge mechanism on the rear end of the body and a hydraulic cylinder on the front of the body, wherein movement of the cylinder causes the body to pivot about the rear hinge mechanism. This pivoting movement provides the bodies with the ability to dump material from the rear of the bodies.

A tailgate can be provided that covers the rear of the body. The tailgate can pivot into an open position when it is desired to utilize the dumping functionality of the body.

A conventional combination body can further include a conveyor system that transports material residing within the body out of the body and into one or more spreaders mounted on the exterior of the vehicle. The tailgate can include at least one opening therethrough to provide a means by which the material, upon transport by the endless conveyor, can be expelled from the rear of the body. Upon being expelled from the body through the tailgate opening, the material can be directed into a rear spreader at least in part by a cover or tail gate chute affixed to the tailgate.

While existing combination dump and spreader bodies provide many desirable features and advantages, there remain certain problems with these combination bodies. For example, a combination body configured to be used with a tailgate typically has an open rear end, which reduces the overall structural integrity of the body. Providing a conveyor that runs lengthwise down the center of the body further reduces the strength of the body across the body width at the rear end because the middle portion of the main reinforcement of the rear base of the body is removed to make room for the conveyor system. This is especially a problem in a truck body having an essentially flat floor. The reduced strength of the body can lead to the body sagging at its rear end.

In addition, a vehicle with a conventional combination body is often difficult to convert from a "snow truck" to a "general purpose truck." A truck body that can easily be used for both winter and summer applications would be very desirable to help limit the number of vehicles a municipality might need to own and maintain. Furthermore, the ability to rapidly convert a vehicle from a "snow truck" configuration to a "general purpose truck" configuration can increase the municipality's workforce productivity during the winters months because many winters include days having weather that allows for, or even requires, work to be done without the interference of the "snow truck" equipment.

Another issue with conventional combination bodies is that they can be very difficult to disassemble. Certain parts of combination bodies, such as the conveying system, often require maintenance. However, limited access can make it difficult to disassemble certain parts of the combination body to perform such maintenance. Often those performing maintenance on the conveying system must intentionally destroy certain parts of the combination body, especially conveyor shafts and the surrounding area, that otherwise are functioning normally to access the parts of the combination body requiring service. This practice is inefficient and wasteful.

In view of the foregoing, there exists various needs in the art. One such need is for a combination body with increased strength which still includes a pivotally mounted tailgate and a conveyor system. A further need exists for a combination body that is readily convertible between a snow truck configuration and a general purpose configuration. An additional need is for a combination body having a conveyor shaft assembly that can be easily and reliably disassembled and reassembled.

SUMMARY OF THE INVENTION

The present disclosure addresses the foregoing and other needs. In one aspect of the present disclosure, there is provided a vehicle including a chassis and a body pivotally secured to the chassis at a hinge. The body includes a front end, first and second side walls in spaced relationship to each other, and an open rear end. A tailgate is pivotally connected to the rear end of the body. A rear body superstructure is provided to reinforce the rear end of the body.

In one embodiment, a vehicle includes a chassis and a body mounted thereto. The body includes a front end, an open rear end in longitudinal spaced relationship to the front end, and first and second side walls in lateral spaced relationship to each other and extending longitudinally between the front end and the open rear end. The body includes a rear body superstructure comprising a C-shaped structural beam extending around the rear end such that the structural beam is in overlapping relationship with the first and second side walls.

In another aspect of the present disclosure, a vehicle includes a body, a tailgate mounted to the body, and a tailgate chute removably mounted to the tailgate. The tailgate chute includes a movable slide plate assembly for selectively opening or closing the chute. The tailgate chute can be easily removable from the tailgate.

In one embodiment, a vehicle includes a chassis and a body mounted thereto. The body has a front end, an open rear end in longitudinal spaced relationship to the front end, and first and second side walls in lateral spaced relationship to each other and extending longitudinally between the front end and the open rear end. A tailgate is pivotally mounted to the open rear end of the body. The tailgate includes an opening therein and a mounting bar extending across the opening. A tailgate chute is removably mounted to the tailgate such that it is in at least partial covering relationship with the opening of the tailgate. The tailgate chute includes a mounting hook adapted to retentively engage the mounting bar of the tailgate.

In yet another aspect of the present disclosure, a vehicle includes a body with a conveyor assembly disposed therein. The conveyor assembly includes means for mounting a conveyor shaft assembly that allow for ready removal.

In one embodiment, a vehicle includes a chassis and a body mounted thereto. The chassis includes a pair of longitudinally extending beams in spaced relationship to each other. Each beam has an aperture therethrough. The apertures are substantially aligned with each other. The body has a front end, an open rear end in longitudinal spaced relationship to the front end, and first and second side walls in lateral spaced relationship to each other and extending longitudinally between the front end and the open rear end. A conveyor assembly is disposed within the body and extends generally longitudinally. The conveyor assembly includes a conveyor shaft assembly removably mounted to the chassis. The conveyor shaft assembly includes a shaft having a pair of distal ends. The shaft is adapted to extend between the beams of the chassis such that at least one of the distal ends projects laterally outwardly from a respective beam. The conveyor shaft assembly includes at least one mounting plate movably arranged with one of the distal ends of the shaft such that the mounting plate is longitudinally movable between a mounting position wherein the mounting plate is adapted to support the shaft in a tensioned position and one of a range of relaxed positions wherein the shaft is removable through at least one of the apertures of the beams.

DETAILED DESCRIPTION OF EMBODIMENTS OF THE INVENTION

In accordance with the teachings of the present disclosure, there is provided a vehicle having a body with an open rear end that is strengthened by a rear body superstructure. In some embodiments, the rear body superstructure comprises a continuous C-shaped structural beam extending around the rear end of the body.

In other embodiments, the vehicle can include a tailgate pivotally mounted to the open rear end of the body. The tailgate can include an opening therein and a mounting bar extending across the opening. A tailgate chute can be removably mounted to the tailgate such that it at least partially covers the opening in the tailgate. The tailgate chute can include a pair of mounting hooks adapted to retentively engage the mounting bar of the tailgate. The tailgate chute can include a movable slide plate assembly for selectively opening or closing the chute.

In yet other embodiments, the vehicle can include a conveyor assembly disposed within the body. The conveyor assembly can include at least one, quick-release conveyor shaft. The shaft can be mounted to the chassis of the vehicle. The chassis can include a pair of beams each having an aperture therethrough adapted to allow the conveyor shaft to fit therethrough. At least one bearing mounting plate is provided to support the conveyor shaft in a tensioned position.

Figure 1:
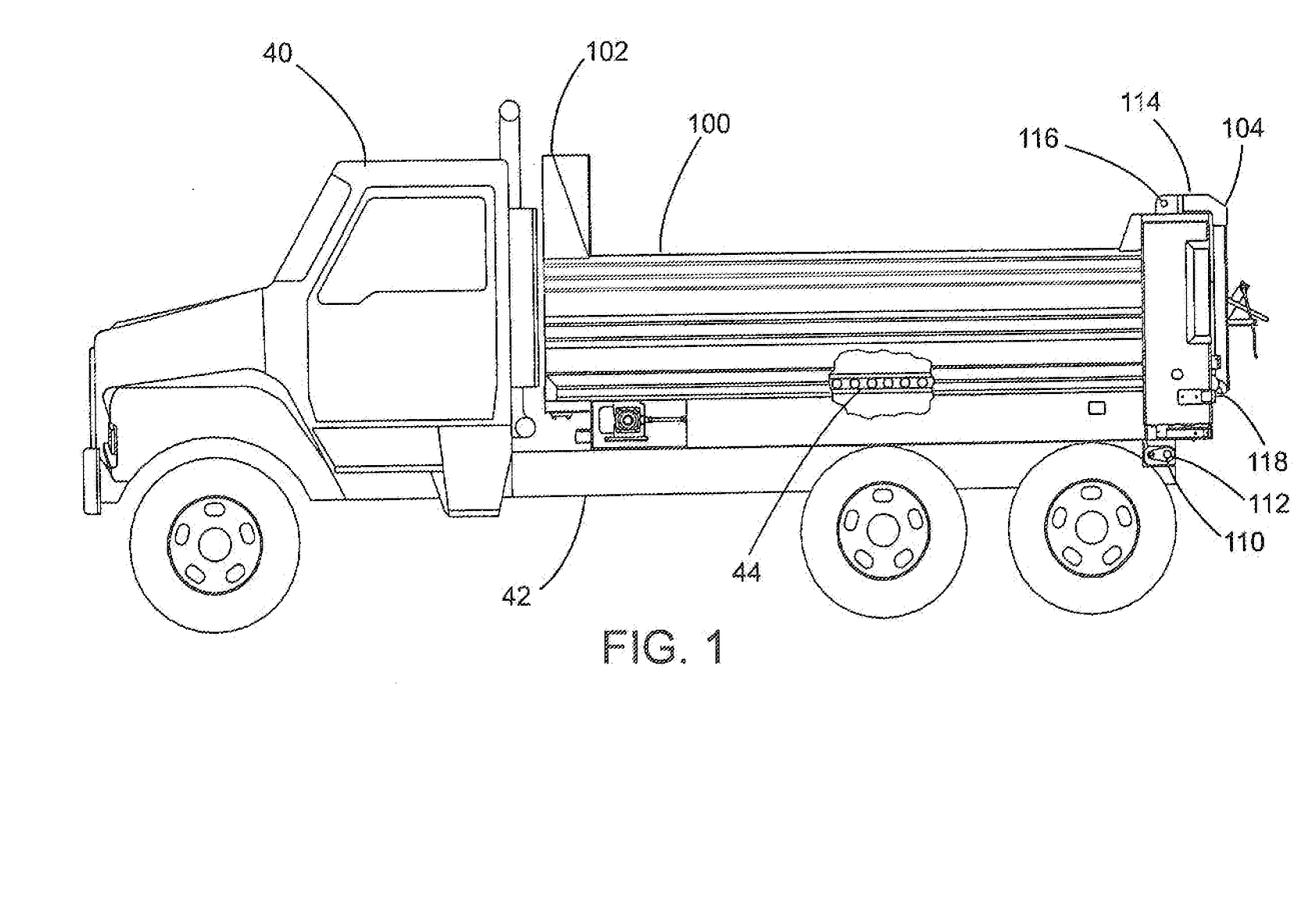
FIG. 1 is a side elevational view of an embodiment of a vehicle in accordance with principles of the present disclosure.

Turning now to the drawings, there is shown in FIG. 1 an embodiment of a vehicle 40 having a chassis 42 and a combination body 100 mounted thereto and adapted to dump and spread material stored therein. The body 100 has a front end 102, an open rear end 104 in longitudinal spaced relationship to the front end 102, a pair of side walls 106, 108 in lateral spaced relationship to each other and extending longitudinally between the front end 102 and the open rear end 104 (see FIG. 2), and a substantially flat floor.

The body 100 is pivotally mounted to a chassis 42 about a pivot axis 110 which extends perpendicularly to the length of the body 100. More specifically, the body 100 is connected to the chassis 42 by a rear hinge assembly 112 which allows for pivotal movement about the pivot axis 110.

The vehicle 40 includes a hoist, which typically includes a hydraulic cylinder, connected between the body 100 and the chassis 42 for pivoting the body 100 about the pivot axis 110 relative to the chassis 42. The hoist is disposed at a point forward the pivot axis 110 of the body 100. The hoist is operable to pivot the front end 102 on the rear hinge assembly 112 about the pivot axis 110 over a range of travel between a lowered position (as shown in FIG. 1) and a raised position suitable for dumping operations.

There is also provided a conveyor assembly for selectively conveying materials from the body 100. The conveyor assembly includes an endless conveyor 44 disposed between the side walls 106, 108 in an opening in the floor and extending longitudinally from the front end 102 to the rear end 104 of the body 100. The conveyor is configured to engage material in the body 100 and carry the material toward the rear end 104. The conveyor assembly can be driven by one or more motors mounted in any number of suitable locations on the vehicle.

In other embodiments, the conveyor assembly can include a cross-conveyor disposed adjacent the front end 102 of the body 100. The endless conveyor 44 can also be driven in a forward direction such that material stored within the body 100 is urged to the front end 102 of the body 100 to be expelled either side of the body via the cross conveyor.

Figure 9:
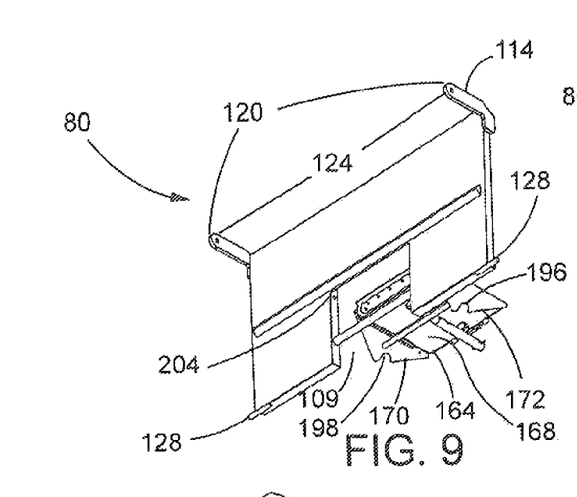
FIG. 9 is a bottom, interior perspective view of a tailgate and a tailgate chute of the vehicle of FIG. 1.
Figure 10:
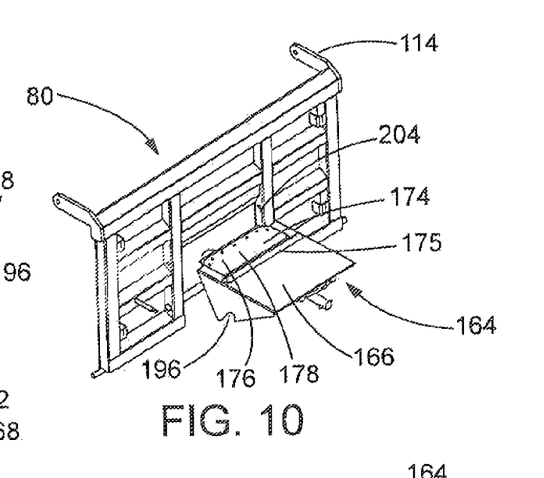
FIG. 10 is a top, exterior perspective view of the tailgate and the tailgate chute of FIG. 9.
Figure 11:
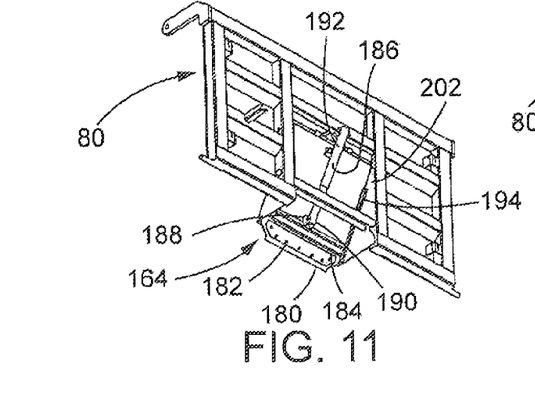
FIG. 11 is a bottom, exterior perspective view of the tailgate and the tailgate chute of FIG. 9, illustrating the tailgate chute removably mounted to the tailgate.
Figure 12:
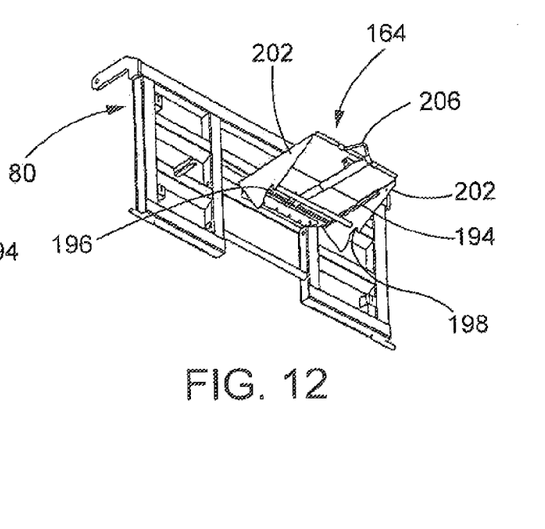
FIG. 12 is a bottom, exterior perspective view of the tailgate and the tailgate chute of FIG. 9.
Figure 13:
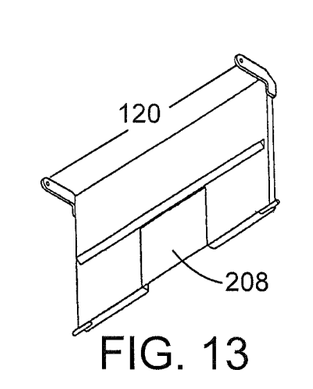
FIG. 13 is a bottom, interior perspective view of the tailgate of the vehicle of FIG. 1 and an embodiment of a tailgate opening cover plate.
Figure 14:
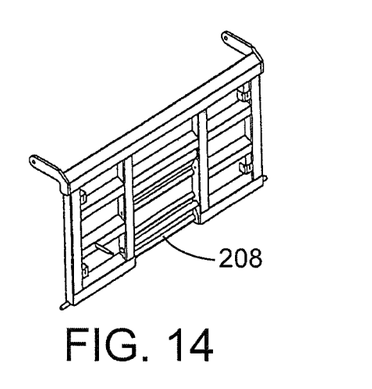
FIG. 14 is a top, exterior perspective view of the tailgate and the tailgate cover plate of FIG. 13.
Figure 15:
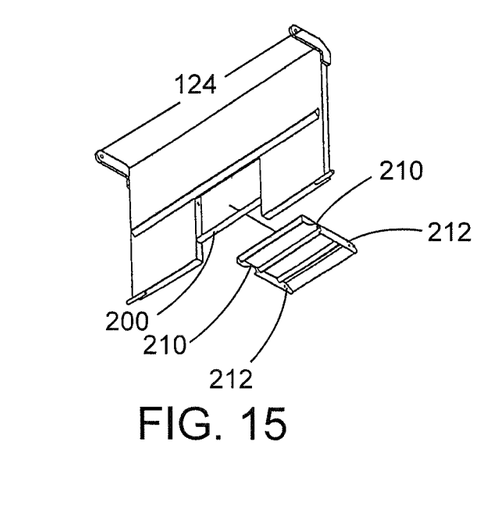
FIG. 15 is a bottom, interior perspective view of the tailgate and the tailgate cover plate of FIG. 13, illustrating the cover plate removed from the tailgate.
Figure 16:
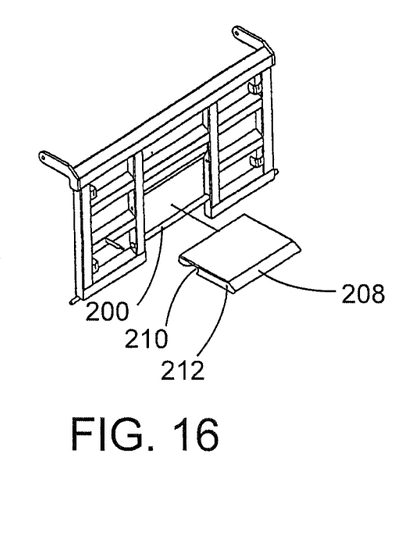
FIG. 16 is a top, exterior perspective view, as in FIG. 15, of the tailgate and the tailgate cover plate of FIG. 13.
Figures 17, 18, 19:
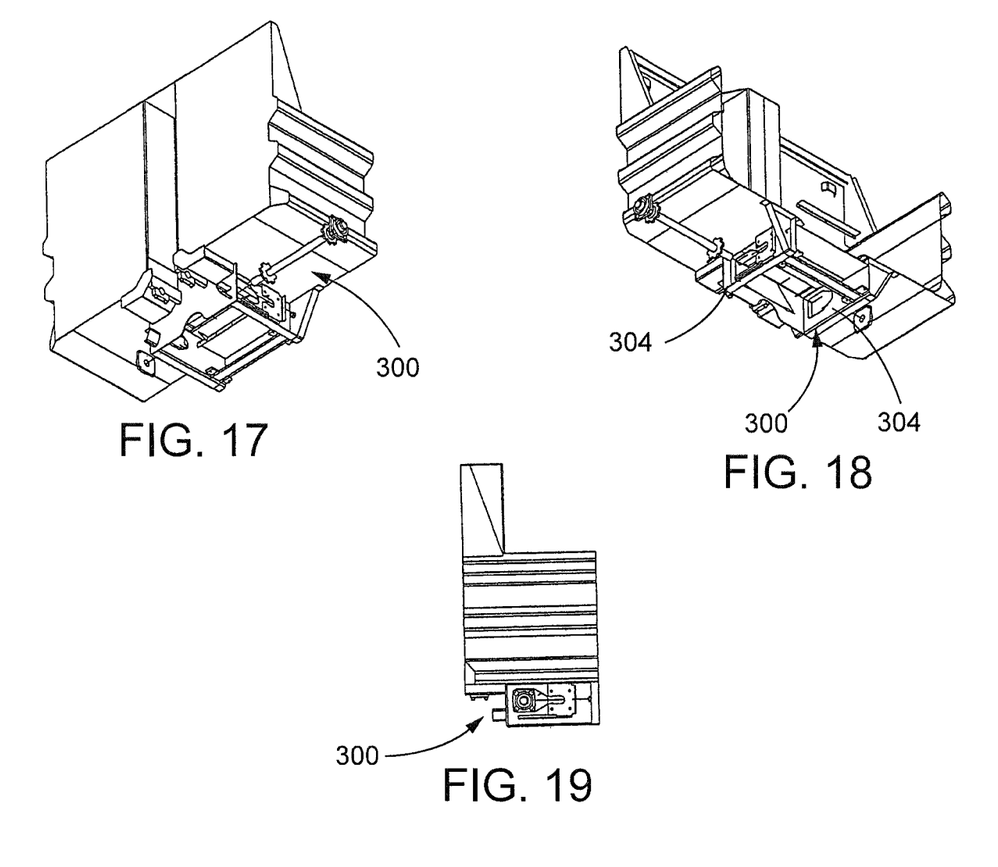
FIG. 17 is a fragmentary, bottom front perspective view of a front portion of the body of the vehicle of FIG. 1 with a front conveyor shaft assembly removed therefrom for illustrative purposes.
FIG. 18 is bottom rear perspective view of the front portion of the body of FIG. 17.
FIG. 19 is a side elevational view of the front portion of the body of FIG. 17.
Figure 20:
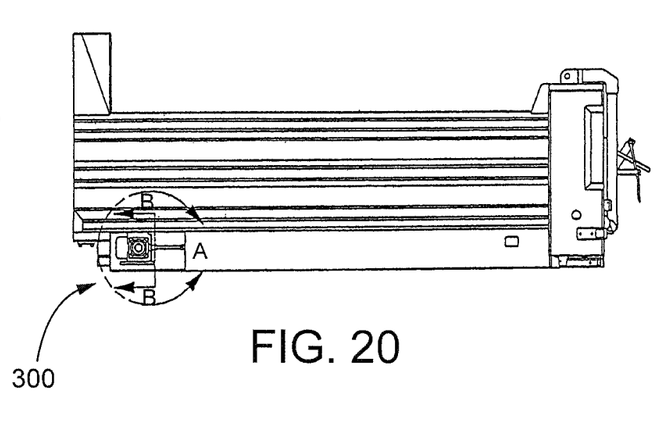
FIG. 20 is a side elevational view of the body of the vehicle of FIG. 1.
Figure 21:
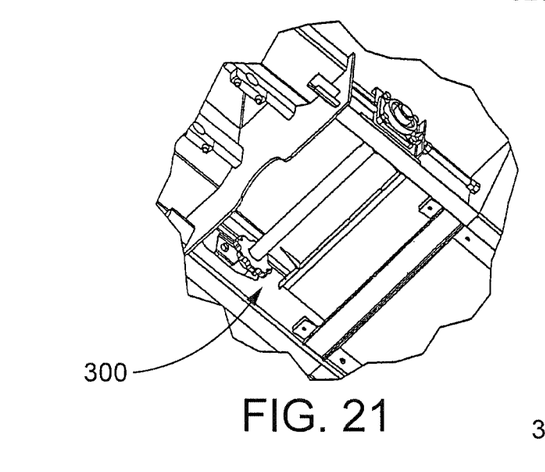
FIG. 21 is a fragmentary, bottom perspective view of the front conveyor shaft assembly mounted to the body of the vehicle of FIG. 1.
Figure 22:
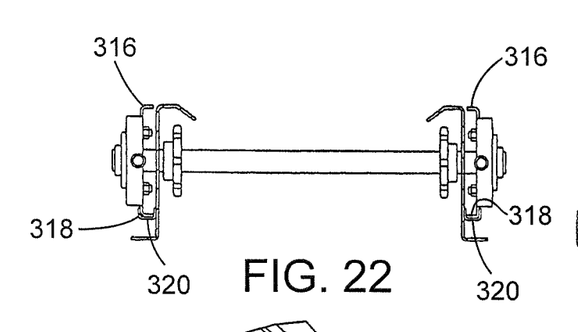
FIG. 22 is a cross-sectional view of the body and the front conveyor shaft assembly taken along ling B-B in FIG. 20.
Figure 23:
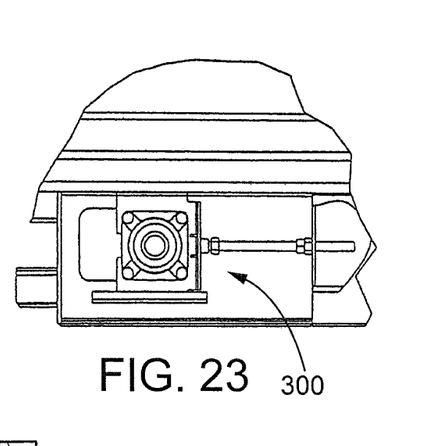
FIG. 23 is an enlarged detail view taken from the circle A in FIG. 20.

Referring to FIGS. 1, 9 and 10, a tailgate 114 is provided at the rear end 104 of the body 100 and extends transversely between the sidewalls 106, 108. The tailgate 114 is releasably and pivotably secured to rear end 104 of the body 100 at an upper pivot axis 116 and a lower pivot axis 118, both axes 116, 118 being perpendicular to the length of the body 100.

Referring to FIG. 9, the tailgate 114 includes an opening 109 through which conveyed material can be expelled from the body 100 via the conveyor assembly. To provide for the upper pivot axis 116, the tailgate 114 includes a pair of side support arms 120 at its upper end that cooperate with complementary brackets 122 on the side walls 106, 108 of the body (see FIG. 2) for securing the tailgate 114 on the rear end 104 of the body 100. The support arms 120 each include a hole 124 for receiving a pin 126, retained by the bracket 122, therethrough to pivotally connect the tailgate 114 to the body 100 about the upper pivot axis 116.

Referring to FIG. 9, the tailgate 114 also includes a pair of posts 128 affixed to its lower end that extend outwardly toward the side walls 106, 108 when the tailgate 114 is mounted to the body. The posts 128 can be pivotally secured to a pair of mounts 130 on the body 100 (see FIG. 3) to provide for pivotal movement about the lower pivot axis 118 of the tailgate 114. The posts 128 may be released from the mounts 130 to allow the tailgate 114 to pivot about its upper pivot axis 116 to facilitate dumping of material from the body 100.

In other embodiments, one or more spreaders can be provided for spreading material the conveyor assembly expels from the body. For example, a spreader can be disposed adjacent the rear end 104 of the body such that it receives material that falls from the end of the endless conveyor 44.

Referring to FIGS. 2-8, in accordance with an aspect of the present disclosure, an embodiment of a rear body superstructure 132 is shown mounted to the body 100. The rear body superstructure 132 is located adjacent the rear end 104 of the body 100 and generally forms a "C"-shaped reinforcement beam about the rear end 104 of the body 100. The superstructure advantageously provide strength and resistance to bending of the rear end 104 of the body 100. The rear body superstructure 132 includes a C-shaped structural beam extending around the rear end 104 such that the structural beam is in overlapping relationship with the first side wall 106, the floor, and the second side wall 108.

Referring to FIGS. 4-7, the superstructure 132 includes a floor support beam 50 and a pair of upright bolsters 52, 54. The floor support beam 50 has a pair of ends and extends between the first and second side walls 106, 108 across the opening in the floor of the body that accommodates the endless conveyor 44. The bolsters 52, 54 respectively extend upwardly from the ends of the floor support beam along a respective side wall 106, 108. The bolsters 52, 54 and the floor support beam 50 cooperate together to form a C-shaped beam.

Figure 8:
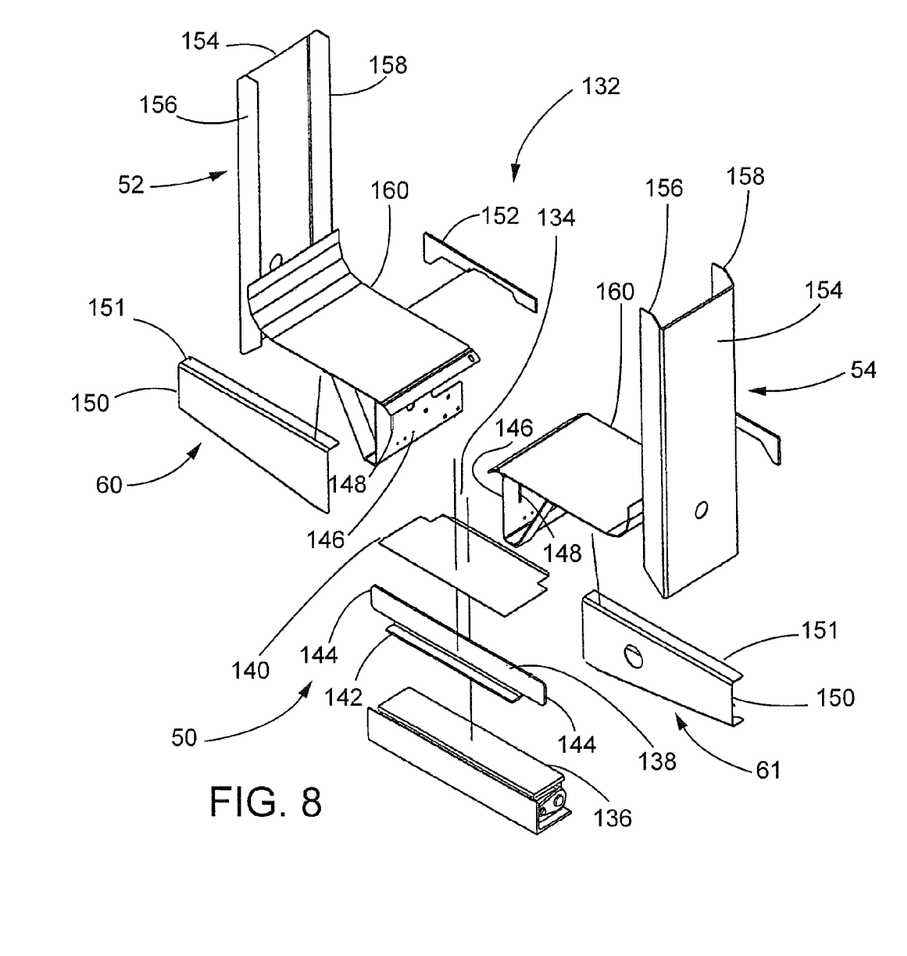
FIG. 8 is an exploded view of the rear portion of FIG. 4.

Referring to FIG. 8, the floor support beam 50 includes a center reinforcing section 134 and a pair of flanking body support sections 60, 61. The center reinforcing section 134 and the flanking body support sections 60, 61 extend in a generally horizontal fashion between the sidewalls of the body to define a floor support beam 50 for the body.

The center reinforcing section 134 includes a main center beam 138. Each body support section 60, 61 includes an apron 150 in the form of a structural, tapered channel. The aprons 150 tie the main center beam 138 to a respective rear bolster 52, 54.

Figure 2:
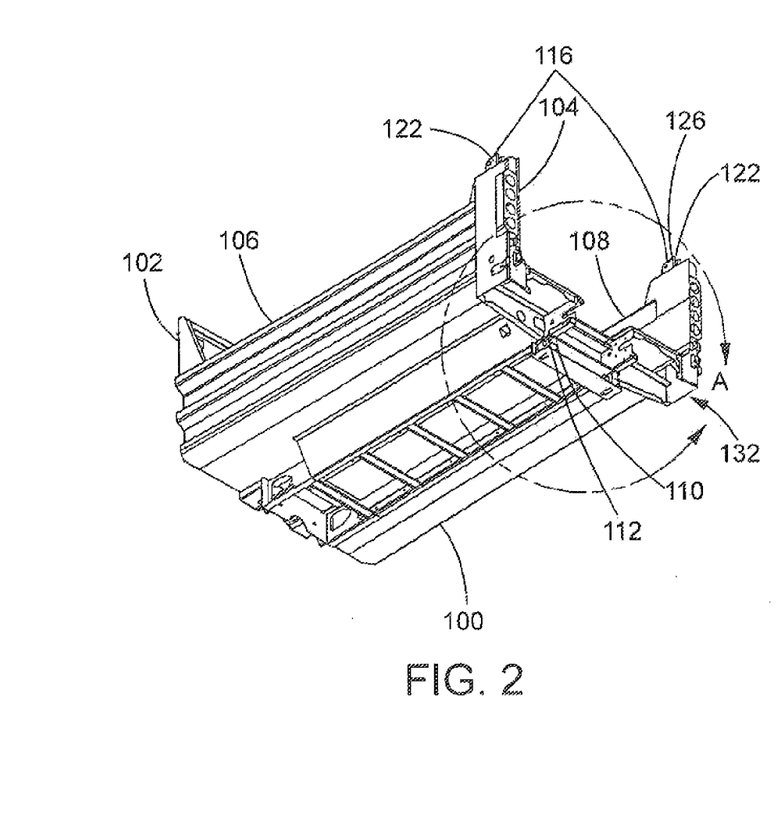
FIG. 2 is a bottom perspective view of a body of the vehicle of FIG. 1.
Figure 3:
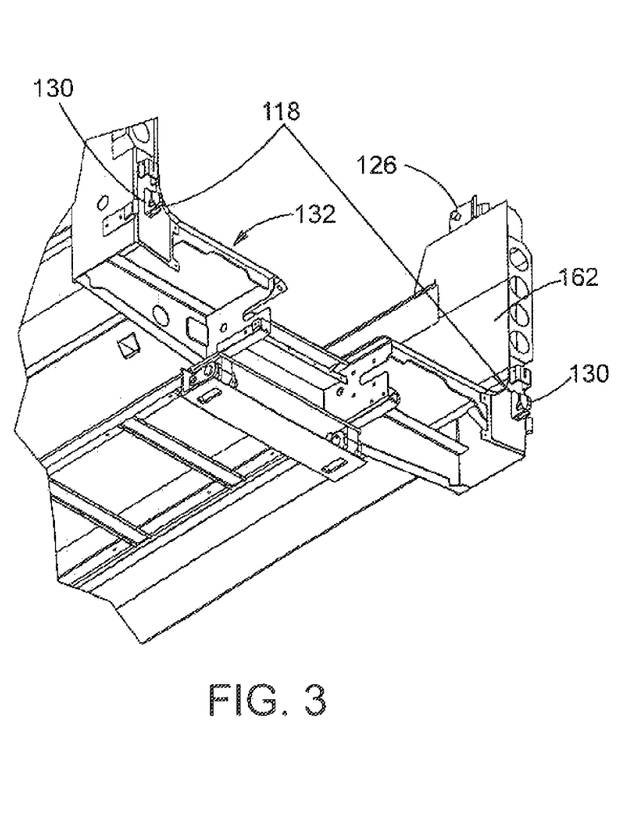
FIG. 3 is an enlarged, detail view taken from the circle A in FIG. 2.
Figure 4:
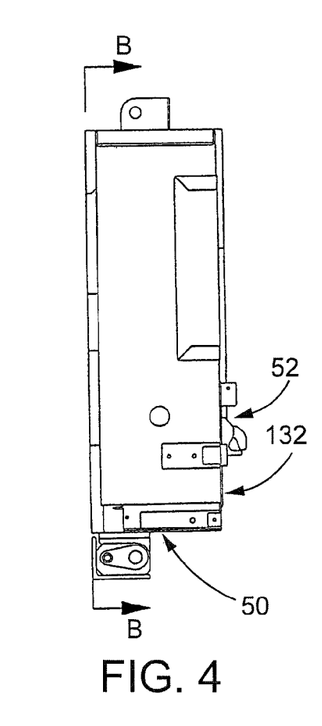
FIG. 4 is a fragmentary, side elevational view of a rear portion of the body of FIG. 2.
Figure 5:
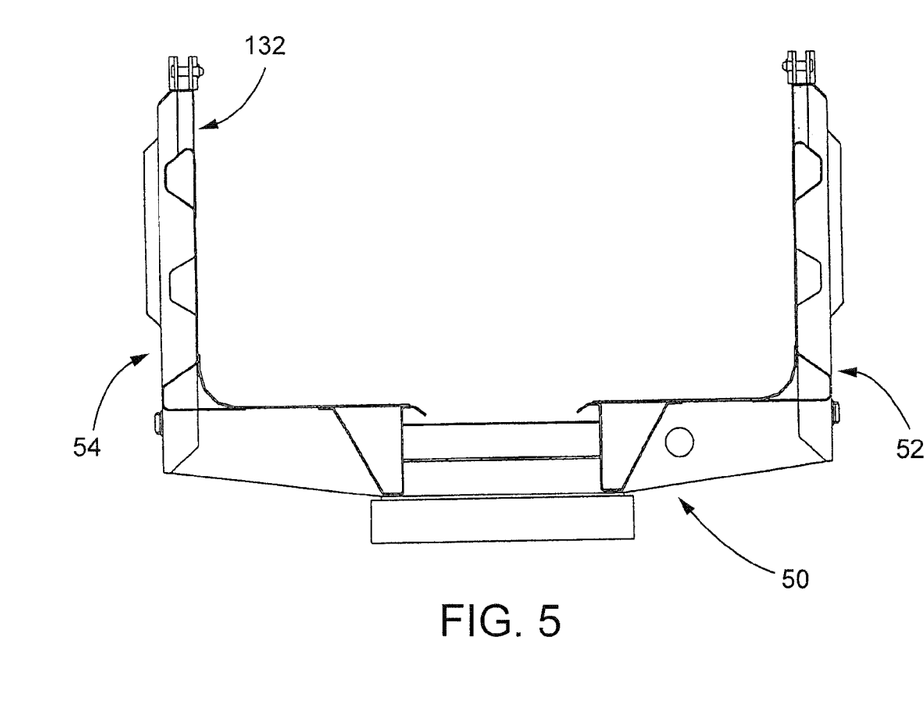
FIG. 5 is a cross-sectional view, taken along line B-B in FIG. 4, of the rear portion of the body of FIG. 2.
Figure 6:
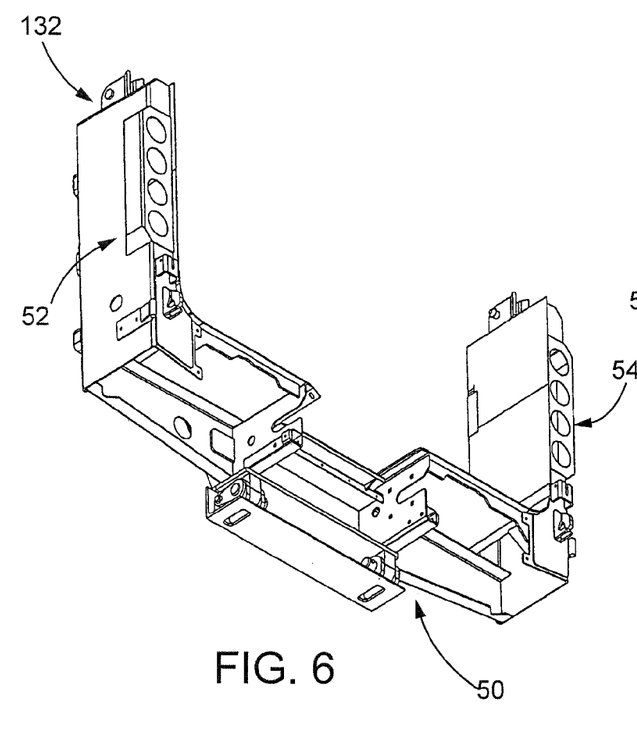
FIG. 6 is a bottom perspective view of the rear portion of FIG. 4.
Figure 7:
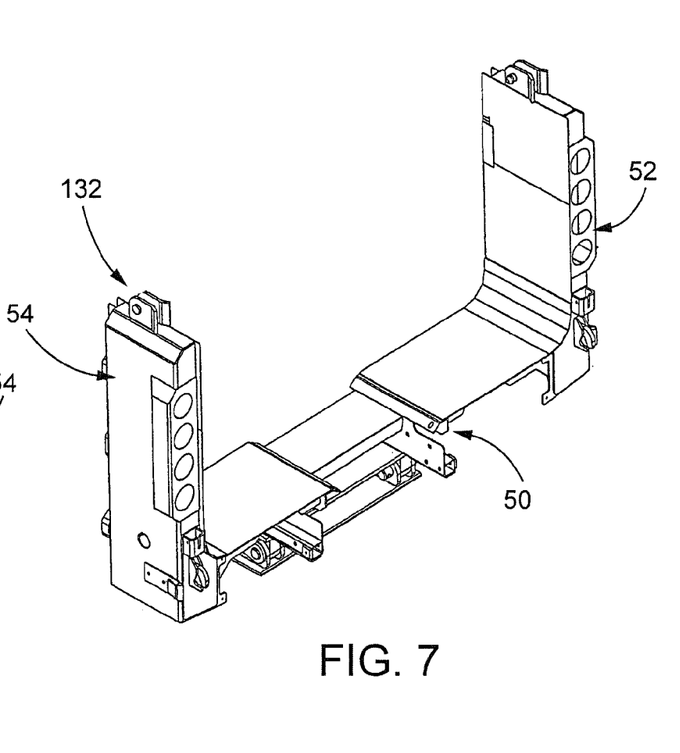
FIG. 7 is a top perspective view of the rear portion of FIG. 4.

The center reinforcing section 134 includes a rear hinge plate 136, the main center beam 138, and the conveyor floor 140. The rear hinge plate 136 is attached across a pair of pivot blocks as part of the rear hinge assembly 112. The rear hinge plate 136 is connected to the main center beam 138 providing further support. As shown in FIG. 8, the main center beam 138 includes a lip 142 that can be used to connect the main center beam 138 to the rear hinge plate 136. Referring to FIGS. 2 and 3, the main center beam 138 can be attached to the rear hinge plate 136 by welding or any other suitable technique. The main center beam 138 also includes tabs 144, each projecting toward a respective side walls 106 and 108 of the body. The conveyor floor 140 extends the length of the body underneath the conveyor. The conveyor floor 140 connects to the main center beam 138 to provide further support to the superstructure 132.

The main center beam 138 can act to carry the load from side wall to side wall. The rear hinge plate 136 can act as a bottom flange of the main center beam 138. The floor of the conveyor are can act as a top flange of the main center beam 138. Together, the floor of the conveyor area, the main center beam, and the rear hinge plate can act as an I-beam. The main center beam 138 comprises the web, and the conveyor area floor and the rear hinge plate comprise the top and bottom flanges, respectively.

The body 100 includes a pair of rear sills 146 that each has a slot 148 therein. The slots 148 are sized to allow the tabs 144 of the main center beam 138 to extend therethrough so that the main center beam 138 can be connected to the aprons.

Each body support section 60, 61 includes one of the aprons 150 and one of a pair of floor support bars 152. The rear aprons 150 are placed such that they can be connected to the tabs 144 of the main center beam 138 and the rear sills 146. Each aprons 150 has a pair of flanges 151 to form a generally C-shaped cross section. The floor support bars 152 are connected to the rear sills 146. Additionally, the conveyor floor support 140 is connected to the rear sills 146.

Each of the rear bolsters 52, 54 is generally vertical and forms a respective portion of the sidewalls 106, 108. The rear bolsters 52, 54 each include a side panel 154, a front flange 156 and a rear flange 158. The front flanges 156 of the rear bolsters 52, 54 are connected to the rear aprons 150. The rear flanges 158 of the rear bolsters 52, 54 are connected to the body floor support bars 152.

Body floor pieces 160 extend the length of the body 100. The body floor pieces 160 are connected to the bolsters 54, the rear aprons 150, the rear floor support bars 152, and the rear sills 146. The body floor pieces 160 can be connected to corresponding body side pieces 162 that also run the length of the body 100. In other embodiments, the body floor pieces 160 and the body side pieces can be formed from one continuous piece.

Referring to FIGS. 9-16, an embodiment of a tailgate system 80 is shown that is suitable for mounting to the body 100. A tailgate can be pivotally mounted to an open rear end of a body. The tailgate can include an opening therein and a mounting bar extending across the opening. A tailgate chute can be removably mounted to the tailgate such that it is in at least partial covering relationship with the opening of the tailgate. The tailgate chute includes a mounting hook adapted to retentively engage the mounting bar of the tailgate.

Referring to FIGS. 9-12 an embodiment of a tailgate chute 164 is shown. The tailgate chute 164 is adapted to allow material being discharged by the conveyor assembly from the rear end of the body to exit the body while the tailgate is in the closed position. The tailgate chute 164 is easily removable from the tailgate so that the combination body can be changed for different operations. The tailgate chute 164 includes a movable portion so that a portion of the tailgate can be opened to allow material to be conveyed out of the back of the body in a metered fashion.

The chute 164 is removably mounted to selectively cover the opening 109 in the tailgate 114. The chute 164 includes a shroud 166. The shroud 166 has a face 168 and two side walls 170, 172. One or more stiffeners 175 can be provided to increase the strength of the shroud 166.

The face 168 of the shroud 166 includes an opening 174 through which conveyed material can travel. A slide plate assembly 176 is configured to selectively cover the opening 174 of the face 168 when in the closed position and to allow material to pass through the chute 164 when in one of a range of open positions. The slide plate assembly 176 is constructed of a main plate 178, a seal piece 180, and a cover plate 182. The seal piece 180 is sandwiched between the main plate 178 and the cover plate 182.

The main plate 178, seal piece 180, and cover plate 182 can be connected by bolts or any other suitable means. The seal piece 180 can be constructed of rubber or any other suitable material that can provide a sufficient engaging seal against the conveyor when the slide plate assembly 176 is in the closed position. The slide plate assembly 176 can include one or more stiffeners 184 to increase the strength of the slide plate assembly 176.

An actuator 186 in the form of a screw jack, for example, can be provided to move the slide plate assembly over a range of travel between the closed position and a range of open positions. The screw jack 186 is attached at a lower end 188 to the slide plate assembly 176 by tabs 190 mounted to the screw plate assembly 176. The screw jack 186 can also be attached at an upper end 192 to the shroud 166 such that when the screw jack 186 is activated, it can move the slide gate assembly 176 between an open position and a closed position. The chute 164 can include guides 194 adapted to guide the slide gate assembly 176 as it is moves between a closed position and an open position.

The chute 164 is designed such that it can be readily moved between an installed position (see FIG. 11) and an uninstalled position (see FIG. 9). The chute 164 includes a pair of mounting hooks 196, 198 on the shroud sidewalls 170, 172. The mounting hooks 196, 198 are adapted to retentively engage a mounting bar 200 attached to the tailgate 114 when the chute 164 is in the installed position. The mounting bar 200 is attached by welding or any other appropriate means to the tailgate 114 and can provide additional strength to the tailgate 114. The chute also includes one or more mounting apertures 202 located and configured to matingly align with corresponding mounting apertures 204 in the tailgate 114. When the chute 164 is in the installed position, pins or other connectors can be inserted through the aligned chute apertures 202 and the tailgate apertures 204 to retain the chute 164 in the installed position.

The chute 164 includes a lift hook 206 to facilitate the installation and the removal of the chute using a lifting device, such as a winch, for example. The lift hook 206 can be attached to the shroud 166 by any appropriate means. In this embodiment, the lift hook 206 is pivotally connected to the shroud.

Once the tailgate chute 164 is removed, it can be replaced by another tailgate component. For example, if the conveyor is not in use, the tailgate chute 164 can be replaced by a cover to occlude the opening in the tailgate.

Referring to FIGS. 13-16, an embodiment of a tailgate opening cover 208 is shown. The tailgate opening cover 208 includes a pair of mounting hooks 210 adapted to retentively engage the mounting bar 200 such that it can be removably mounted to the tailgate 114. The tailgate opening cover 208 can include mounting apertures 212 adapted to matingly align with the mounting apertures 204 of the tailgate 114 to secure the tailgate cover 208 in an installed position via pins or other suitable connectors.

Referring to FIGS. 17-25, an embodiment of a quick release conveyor shaft assembly 300 is shown. The quick release conveyor shaft assembly 300 is disposed at the front of the conveyor assembly. The conveyor shaft assembly 300 allows for the ready installation of the conveyor shaft assembly 300 to the chassis of the vehicle and the ready, complete removal of the conveyor shaft assembly 300 for service, for example.

The conveyor shaft assembly 300 includes a shaft having a pair of distal ends. The shaft is adapted to extend between the beams of the chassis such that at least one of the distal ends projects laterally outwardly from a respective beam. At least one mounting plate is movably arranged with a projecting distal end of the shaft such that the mounting plate is longitudinally movable between a mounting position wherein the mounting plate is adapted to support the shaft in a tensioned position and one of a range of relaxed positions wherein the shaft is removable through at least one of the apertures of the beams.

In other embodiments, the quick release conveyor assembly can be used at the rear end of the conveyor assembly. Further, while the illustrated conveyor shaft assembly 300 is a driven assembly, i.e., an assembly without a motor attached, the conveyor shaft assembly can equally apply to a drive shaft assembly 308, i.e., with a motor attached.

Figure 24:
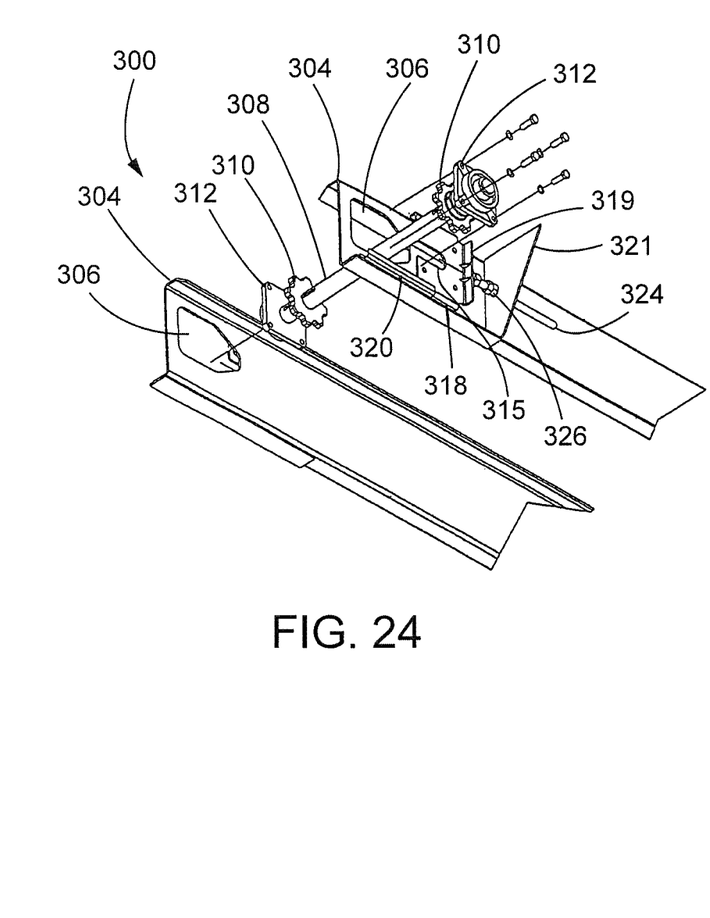
FIG. 24 is a bottom perspective view of the front conveyor shaft assembly and a fragmentary perspective view of a chassis of the vehicle of FIG. 1.
Figure 25:
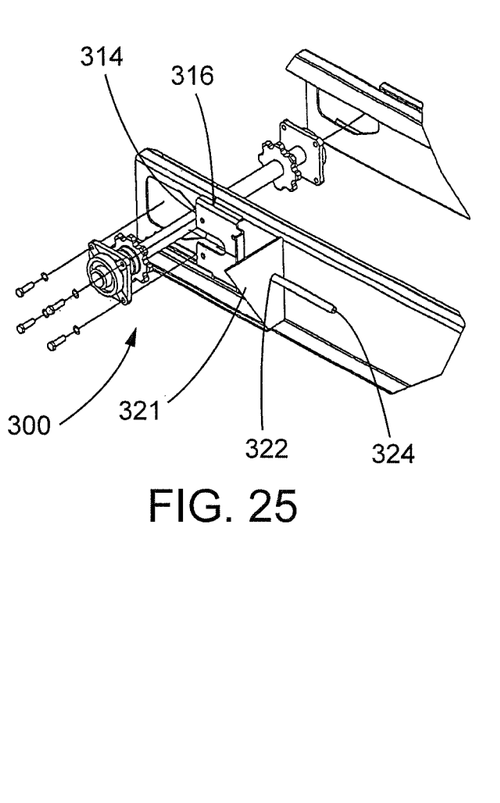
FIG. 25 is a top perspective view of the front conveyor shaft assembly and the chassis as in FIG. 24.

Referring to FIG. 24, the conveyor shaft assembly 300 includes a conveyor shaft or rod 308, a plurality of sprockets 310 supported on the shaft 308 and rotatively coupled thereto, a pair of bearings 312, which are also respectively connected to the ends of the conveyor rod 308, and a pair of bearing mounting plates 314 adapted to secure the conveyor rod 308 in a tensioned position to the body 100. The bearings 312 are mounted to the rod 308 such that the shaft 308 is rotatable about its longitudinal axis. Front outer sills 304 of the body each include an aperture 306 adapted to allow the rod 308, the sprockets 310, and the bearings 312 to pass through the apertures 306.

The bearing mounting plates 314 each include a mounting slot 315, an upper flange 316, a lower flange 318, and a tensioning flange 319. The upper and lower flanges 316, 318 can be adapted to interact with guides 320 on the sills 304 to allow the bearing mounting plates 318 to slidingly engage the conveyor rod 308, which is supported in the mounting slot 315. The mounting plates 314 can move over a range of travel forward toward the front end 102 of the body to support the shaft in a tensioned position or rearward toward the rear end 104 of the body 100 to place the shaft in a range of relaxed positions. These directions can be reversed for a quick-release shaft assembly at the rear end of the conveyor. This sliding motion allows for easy installation and removal of the conveyor shaft 308 and accompanying parts.

Tensioning tabs 321, attached to the sills 304, each include an aperture 322 through which extends a threaded rod 324. The threaded rod 324 can be threadingly advanced toward the tensioning flange 319 of the mounting plates 314 until the rod engages the tensioning flange 319. Continued advancement of the threaded rod slides the mounting plate into mounted engagement with the conveyor rod 308 such that the conveyor rod 308 is in a tensioned position. A plurality of nuts 326 can be provided to retain the threaded rod 324 in a desired position.

Each mounting plate 314 includes a plurality of mounting holes adapted to matingly align with mounting holes of the corresponding bearing 312. Suitable threaded fasteners and nuts can be used to mount the bearings 312 to the respective mounting plates 314.

With the bearings 312, the conveyor rod 308, and the sprockets 310 connected together, chains can be installed which can be entrained around the sprockets 310 and linked to corresponding sprockets at the rear end 104 of the conveyor system. The conveyor rod 308 can be disposed in the mounting slots 315 of the mounting plates 314. The threaded rods 324 may be advanced to apply force to the tensioning flange 319 of the bearing mounting plate 314. This force causes the bearing mounting plate to move towards the front end 102 of the body 100. The inter-engagement of the conveyor rod 308 and the slots 315 of the bearing plates 314 cause the conveyor rod 308 to move, in turn, toward the front of the body, thereby tightening the chains entrained around the sprockets and moving the front conveyor assembly 300 to a tensioned position.

To remove, the threaded rods 324 can be threadingly retracted toward the rear end of the body, thereby slackening the tension of the chains entrained around the sprockets 310. The threaded rods 324 can be retracted a sufficient distance to allow an operator to remove the chains from the sprockets 310 and to allow the mounting plate 314 to no longer be in overlying relationship with the aperture 306 in the sill 304. The bearings 312, the conveyor rod 308, and the sprockets 310 can be removed, as a unit, from its installed position through the aperture 306.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vehicle comprising:
    a chassis;
    a body mounted to the chassis, the body having a front end, an open rear end in longitudinal spaced relationship to the front end, and first and second side walls in lateral spaced relationship to each other and extending longitudinally between the front end and the open rear end;
    a tailgate pivotally mounted to the open rear end of the body, the tailgate including an opening therein and a mounting bar mounted to the tailgate and extending across the opening;
    a tailgate chute removably mounted to the tailgate such that the tailgate chute is in at least partial covering relationship with the opening of the tailgate, the tailgate chute including a shroud having at least one side wall defining a U-shaped mounting hook adapted to retentively engage the mounting bar of the tailgate such that the shroud is removably mounted to the tailgate.

2. The vehicle of claim 1, wherein the tailgate chute includes a pair of side walls each defining mounting hooks each adapted to retentively and releasably engage the mounting bar.

3. The vehicle of claim 2, wherein the tailgate chute includes a chute opening and a movable slide plate assembly configured to selectively cover the chute opening when in a closed position and to allow material to pass through the chute opening when in one of a range of open positions.

4. The vehicle of claim 3, wherein the slide plate assembly includes a main plate, a seal piece, and a cover plate, the seal piece being disposed between the main plate and the cover plate.

5. The vehicle of claim 4, further comprising:
    a conveyor assembly adapted to selectively convey material from the body, the conveyor assembly including an endless conveyor disposed between the side walls and extending longitudinally from the front end to the rear end of the body;
    wherein the seal piece of the slide plate assembly is adapted to sealingly engage the conveyor when the slide plate assembly is in the closed position.

6. The vehicle of claim 3, wherein the slide plate assembly includes an actuator adapted to move the slide plate assembly over a range of travel between the closed position and a range of open positions.

7. The vehicle of claim 2, wherein shroud further includes a face, the face of the shroud defining the chute opening.

8. The vehicle of claim 2, wherein the chute includes a mounting aperture located and configured to matingly align with a corresponding mounting aperture in the tailgate, the mounting apertures adapted to receive a connector therethrough to retain the tailgate chute with respect to the tailgate.

9. The vehicle of claim 1, wherein the tailgate chute includes a lift hook.

10. The vehicle of claim 1, wherein the tailgate is releasably and pivotably secured to the rear end of the body such that the tailgate can pivot about at least one of an upper pivot axis and a lower pivot axis.

11. The vehicle of claim 1, further comprising:
a tailgate opening cover, the tailgate opening cover including a pair of mounting hooks adapted to retentively engage the mounting bar of the tailgate such that the tailgate opening cover is removably mountable to the tailgate when the tailgate chute is removed.

12. A vehicle comprising:
a chassis;
a body mounted to the chassis, the body having a front end, an open rear end in longitudinal spaced relationship to the front end, and first and second side walls in lateral spaced relationship to each other and extending longitudinally between the front end and the open rear end, the body including a pair of longitudinally extending beams in spaced relationship to each other, each beam having an aperture therethrough, and the apertures being substantially aligned with each other;
a conveyor assembly disposed within the body and extending generally longitudinally, the conveyor assembly including a conveyor shaft assembly removably mounted to the body via at least one mounting plate, the conveyor shaft assembly including a shaft and a plurality of sprockets:
the shaft having a pair of distal ends, the shaft adapted to extend between the beams of the body such that at least one of the distal ends projects laterally outwardly from a respective beam, and
the plurality of sprockets supported on the shaft and rotatably coupled thereto; and
wherein said at least one mounting plate is movably arranged with one of the distal ends of the shaft such that the mounting plate is longitudinally movable between a mounting position wherein the mounting plate is adapted to support the shaft in a tensioned position and one of a range of relaxed positions wherein at least one of the apertures of the beams is configured to allow the conveyor shaft assembly including the shaft and the sprockets to pass through said aperture as an assembled unit.

13. The vehicle of claim 12, wherein the conveyor shaft assembly includes a pair of bearings respectively connected to the distal ends of the shaft, the bearings are mounted to the shaft such that the shaft is rotatable about a longitudinal axis thereof.

14. The vehicle of claim 13, wherein the conveyor shaft assembly includes a pair of mounting plates adapted to support the shaft in a tensioned position, and the mounting plates are respectively associated with the beams.

15. The vehicle of claim 14, wherein the apertures of the beams are configured to allow the conveyor shaft assembly including the shaft, the sprockets, and the bearings to pass through the apertures as an assembled unit.

16. The vehicle of claim 12, wherein the mounting plate includes a mounting slot and a lower flange, the lower flange adapted to interact with a guide channel projecting outwardly from the beam to allow the mounting plate to slidingly engage the shaft such that the shaft is supported in the mounting slot.

17. The vehicle of claim 16, wherein the mounting plate is adapted to be slidingly movable in the guide channel over a range of travel forward toward the front end of the body to support the shaft in a tensioned position and rearward toward the rear end of the body to place the shaft in a range of relaxed positions.

18. The vehicle of claim 16, wherein the mounting plate includes a tensioning flange, the beam includes a tensioning tab extending outwardly therefrom, the tensioning tab having an aperture, and a threaded rod extends through the aperture, the threaded rod adapted to threadingly advance the tensioning flange of the mounting plate to place the shaft in a tensioned position.

19. The vehicle of claim 12, wherein the mounting plate includes a tensioning flange, the beam includes a tensioning tab extending outwardly therefrom, the tensioning tab having an aperture, and a threaded rod extends through the aperture, the threaded rod adapted to threadingly advance the tensioning flange of the mounting plate to place the shaft in a tensioned position.

* * * * *